United States Patent

[11] 3,620,473

[72] Inventor Robert L. Stone
Portland, Conn.

[21] Appl. No. 815,359
[22] Filed Apr. 11, 1969
[45] Patented Nov. 16, 1971
[73] Assignee Raymond Engineering, Inc.
Middletown, Conn.

[54] TAPE TRANSPORTS
11 Claims, 7 Drawing Figs.

[52] U.S. Cl. .......... 242/192
[51] Int. Cl. .......... G11b 15/32
[50] Field of Search .......... 242/192, 198, 199, 200, 202, 210

[56] References Cited

UNITED STATES PATENTS

| | | | |
|---|---|---|---|
| 3,297,268 | 1/1967 | Sawazaki | 242/192 |
| 3,305,186 | 2/1967 | Burdorf et al. | 242/192 |
| 3,467,338 | 9/1969 | Breuer | 242/192 |

FOREIGN PATENTS

| | | | |
|---|---|---|---|
| 1,089,988 | 9/1960 | Germany | 242/192 |

*Primary Examiner*—George F. Mautz
*Attorney*—Mattern, Ware and Davis

ABSTRACT: A peripheral belt tape transport employs a single capstan driving the peripheral belt. The peripheral belt is maintained in contact with the outer layers of magnetic tape on a pair of tape packs. A brake acts on the peripheral belt on the opposite side of the tape packs from the driving capstan. In the preferred embodiment, the brake takes the form of a solid graphite shoe in contact with the peripheral belt at a position where the belt is separated from the magnetic tape. In alternative embodiments, a rotating peripheral belt guide drives a mechanical, viscous, magnetic, or eddy current brake, or a loaded generator, which subtracts energy from the peripheral belt. The operating temperature range of the peripheral belt drive is greatly enhanced by not rigidly adhering the inner ends of the tape to the tape pack hubs and by the use of lubricated tape. The lubricated tape is wound with its oxide side facing outwardly on the tape packs. The tape is separated from the belt at the recording head. Head to tape contact is maintained solely by means of tape tension. Conventional flanged reels support the tape packs.

INVENTOR
ROBERT L. STONE

BY

MATTERN WARE & DAVIS
ATTORNEYS

INVENTOR
ROBERT L. STONE
BY
*MATTERN WARE & DAVIS*
ATTORNEYS

TAPE TRANSPORTS

SUMMARY OF THE INVENTION

The Prior Art and Some of Its Problems

This invention relates to tape transports. More particularly it relates to tape transports for magnetic tape recorders utilized in aerospace applications. The particular tape recorder disclosed in detail is utilized as a mass memory for onboard aircraft and satellite computers.

One of the more important prerequisites of such magnetic tape recorders is low power consumption. One form of tape transport, according to the prior art for such applications, employs a peripheral belt in contact with the outer peripheral layers of a pair of tape packs containing the magnetic recording tape. Such peripheral belt drive transports have taken many forms according to the prior art, such as exemplified in U.S. Pat. Nos. 2,509,500 issued May 30, 1950 to W. Howey, for Reeling Device for Wire Records; 3,114,512 issued Dec. 17, 1963 to R. L. Peshel et al. for Low Power Tape Drive Mechanism; 3,125,311 issued Mar. 17, 1964 to J. K. Willis for Motor Reduction System Coupling Device; 3,154,308 issued Oct. 27, 1964 to W. J. Faulkner for Multi-Track Magazine Tape Recorder with Movable Head and Elastic Band Drive for Tape and Reels; and 3,305,186 issued Feb. 27, 1967, to D. L. Burdorf, et al. for Tape Transport System Using a Drive Belt Contacting Tape Pack; and British Pat. No. 687,927 published Feb. 25, 1953 for Improvements in or relating to Recording or Reproducing Apparatus. All of the above prior art peripheral drive transports offer the hope of simplification of the tape transport mechanism and low power consumption.

However, as far as it is known to applicant, the only peripheral belt drives that have to any degree proved practical for aerospace application are double capstan transports similar to those disclosed in the above identified D. L. Burdorf et al. patent. One reason for this lack of success is believed to be the requirement in prior art transports employing a single capstan driving the peripheral belt for auxiliary tape tensioning means, such as exemplified in the spring pulley acting on the magnetic tape of the above-identified Peshel et al. patent, and the friction brakes of the Willis, Faulkner and British patent and the shorted generator of the Howey patent acting on the supply reels.

Another difficulty in utilizing such tape transports in aerospace applications, particularly on aircraft, are the wide temperature variations to which the tape transport is subjected. Due to the tightness with which the tape packs are wound under the influence of the peripheral belt drive and the fact that they are not free to rotate when no power is supplied to the transport due to the capturing effect of the peripheral belt, peripheral belt drive transports according to the prior art, cannot be subjected to the extreme temperature variations found in modern high-performance aircraft. They, therefore, have not been used in such aircraft or, if used, the required auxiliary environmental control systems have offset in complexity and power consumption, any advantages the transports might otherwise have.

The usual form of failure under wide temperature variations of peripheral belt tape transports occurs as follows: if the tape pack is wound at a high temperature and thereafter, the temperature is dropped to a much lower temperature, voids form in the tape packs which upon operation move to the hubs where the tape becomes permanently distorted. The packs become eccentric and the transports inoperative. The voids may also allow the tape to spill from the flangeless hubs.

Another difficulty that has been found in peripheral drive tape recorders, according to the prior art, is that no reel flanges may be used therewith. The tape packs must be wound on hubs and be entirely self-supporting. If reel flanges are used, small variations in temperature during operation, vibration and the like will often cause the peripheral drive belt to come in contact with the flanges greatly increasing the amount of friction in the system and often causing the system to become inoperative. The lack of reel flanges makes it very difficult to change tapes on such machines. The tape packs being entirely self-supporting must be very carefully removed from the reel supports by an operator, and very often the tape is spilled and must be rewound by hand, which is a long, tedious and somewhat destructive processes as far as the recording on the tape is concerned.

In peripheral belt drive transports such as disclosed in the above-identified Burdorf et al. patent, it has been impossible to design a fixed amount of overdrive into the system. That is, in such systems, one of the belt-driving capstans drives the belt at a slightly higher speed than the other belt-driving capstan. Within normal manufacturing tolerances, the precise necessary overdrive cannot be built into the system. It is therefore necessary to tailor each transport to its own frictional and other losses and idiosyncracies by hand removal of material, either from the pulleys driving the capstans or from the capstans themselves. This is accomplished by a process of approximation and testing by highly skilled technicians.

While offhand, it would appear somewhat desirable to use lubricated tape, that is, tape having graphite or other lubricant on the nonmagnetic surface thereof in such peripheral drive transports in order to reduce frictional losses, such have not been employed in the past, largely due to the fact that lubricated tapes contribute to easier tape spills from unsupported tape packs having no reel flanges found necessary in the prior art when changing tapes.

In tape recorders employed for recording digital information for use with onboard aircraft and satellite computers, there are very stringent requirements for low flutter and wow, that is variations in speed of the magnetic tape across the magnetic transducer. Peripheral belt drive tape transports, according to the prior art, particularly those employing a pair of capstans such as disclosed in the above-identified Burdorf et al. patent, are particularly subject to flutter, which may be induced by shock, vibration or the bearings of the system. According to the prior art, various means have to be provided in such systems, such as the addition of rotating inertial masses coupled to the magnetic tape or to the peripheral belt by viscous or other damping means. On the other hand, it has been found highly desirable to drive aerospace recorders with direct current motors using a feedback system for controlling the speed of the motor. Such systems operate best when there is a minimum amount of total inertia in the tape transport system. The more inertia there is in a system, the more power is required to control the speed of the direct current motor. Thus, the inherent lack of shock and vibration resistance and flutter sensitivity in such peripheral drive recorders, according to the prior art, leads to the inclusion of massive flywheels and energy-absorbing damping means, which are incompatible with feedback controlled capstans and low power consumption.

Objects of the Invention

It is therefore an object of the present invention to provide a tape transport for aerospace application.

Another object of the invention is to provide such a tape transport which may be subjected to wide temperature variations.

Still another object of the invention is to provide such a tape transport which is bidirectional.

A further object of the invention is to provide such a tape transport in which the speed of the magnetic tape motion across the magnetic head is extremely constant.

A yet further object of the invention is to provide such a tape transport in which the tape tension of the magnetic tape is extremely constant and may be utilized as the sole means for providing pressure between the magnetic tape and the magnetic head.

Another object of the invention is to provide such a tape transport which may be operated with a minimum of power.

Still another object of the invention is to provide such a tape transport employing a minimum of moving parts.

Yet another object of the invention is to provide such a tape transport which is resistant to shock and vibration, excitation, bearing effects, discontinuities in tape speed and the like.

Still another object of the invention is to provide such a tape transport employing a peripheral belt drive.

A further object of the invention is to provide such a tape transport employing reels compatible with other forms of reel-driven tape transports.

A yet further object of the invention is to provide such a tape transport which may be manufactured in large quantities and does not require any highly skilled personnel for final adjustment.

Still another object of the invention is to provide such a tape transport in which a minimum of kinetic and potential energy is stored in the tape transport system and in which the speed of the tape transport is servometrically controlled.

Yet another object of the invention is to provide such a tape transport which is highly resistant to a damage to the magnetic tape and to tape spillage.

A further object of the invention is to provide such a tape transport for use as a computer tape memory in aerospace applications.

A still further object of the invention is to provide such a tape transport having a relatively long useful life without change of the tape employed.

A yet further object of the invention is to provide a tape transport of the above character which may be employed as a cartridge for rapid change of the computer information and programs stored therein.

Other objects of the invention will in part be obvious and will in part appear hereinafter.

The invention accordingly comprises the features of construction, combinations of elements, and arrangements of parts which will be exemplified in the tape transports disclosed herein. The scope of the invention is indicated in the claims.

General Description

Referring to FIG. 5 of the drawing, in general, a tape transport according to the present invention comprises a pair of tape packs, generally indicated at 20 and 22, of lubricated magnetic recording tape having the oxide coating facing outwardly from hubs 24 and 26. The tape is driven by a peripheral belt 28 passing around both tape packs 20 and 22 and around freely rotatable belt guides 30, 32 and 34. Belt guide 32 is biased by spring 35 about pivot 36 to provide tension in belt 28 and to compensate for variations in the amount of peripheral belt 28 required. The belt 28 is driven by a capstan 38 and passes over a brake shoe or other kinetic energy absorbing element 40 on the opposite side of the tape packs 24 and 26 from the capstan 38. The magnetic tape 42 passes from one tape pace 20, 22 to the other around a pair of fixed guides 44, 46. The magnetic tape 42 is maintained in contact with a magnetic head 48 solely by the tension in the magnetic tape 42.

Alternatively, as shown in FIG. 6, rather than employing the friction brake shoe 40 as the energy-absorbing element of the system, a rotating belt guide 50 may be mounted on a rotatable shaft 52 driving a mechanical, viscous, magnetic or eddy current brake, or loaded generator 54 to subtract energy from the peripheral belt.

An important feature of the invention, shown in FIG. 7, is that ends 55 of the lubricated magnetic tape 42 are not rigidly adhered to the hubs 24 or 26 but may rotate with respect thereto, this rotation being additionally facilitated by the lubrication 56 on the inner side of the tape 42.

Another feature of the invention, shown in FIG. 1, is the preferred inclusion of reel flanges 58 and 60 for containing the tape packs 20 and 22.

THE DRAWINGS

For further understanding of the nature and the objects of the invention, reference should be had to the following detailed description together with the accompanying drawings in which.

The same reference numbers refer to the same elements throughout the several views of the drawings.

DETAILED DESCRIPTION

Figure 1:
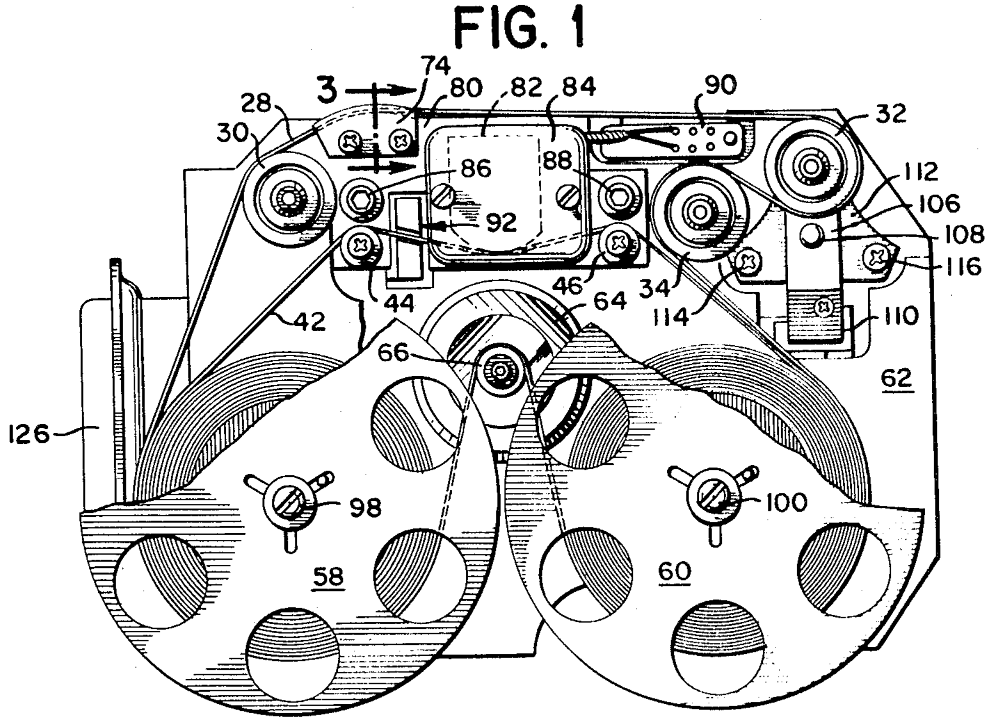
FIG. 1 is a top view of a tape transport according to the invention.
Figure 2:
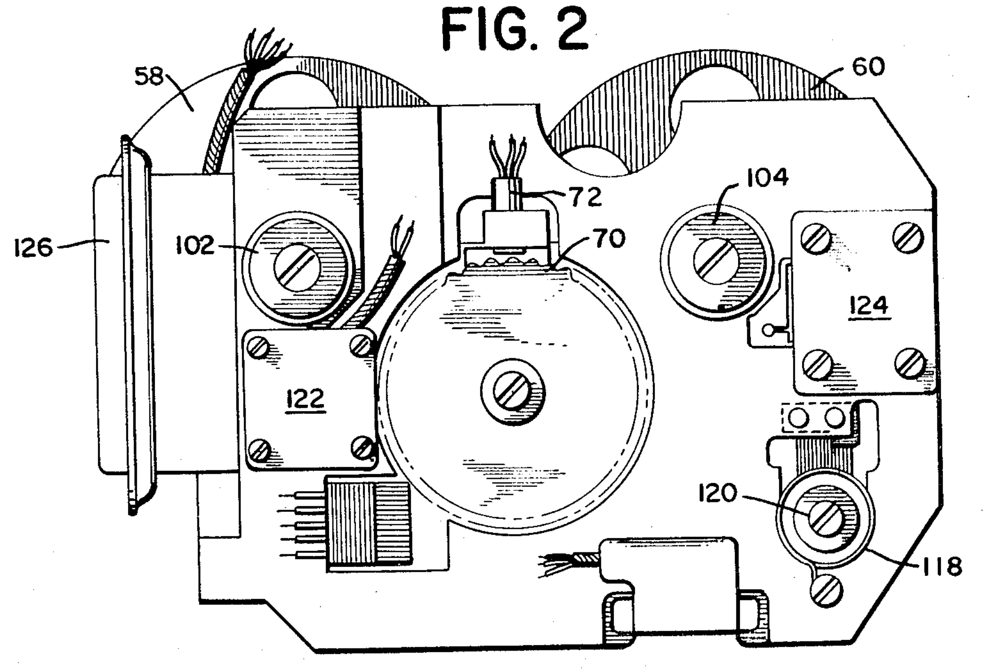
FIG. 2 is a bottom view of the tape transport of FIG. 1.
Figure 4:
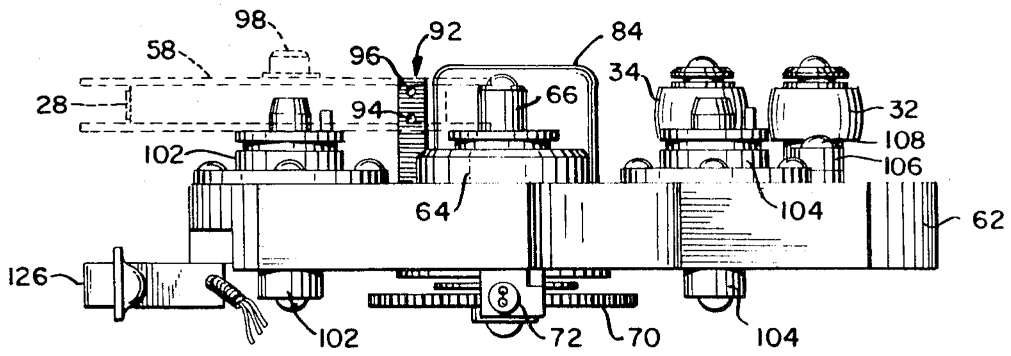
FIG. 4 is a front view of the tape transport of FIG. 1.

More specifically referring to FIGS. 1, 2 and 4, a tape transport according to the present invention for use in high-performance aircraft comprises a strong light transport plate 62 to which all transport parts are mounted. A low-profile direct current motor 64 is mounted in transport plate 62 and is provided with a capstan 66 on the end of its rotor shaft.

Referring to FIGS. 2 and 4, a toothed magnetically permeable wheel 70 is mounted on the other end of the motor shaft and cooperates with a variable reluctance pickup 72 to provide a feedback signal indicating the angular velocity of the capstan 66. In a manner well known to those skilled in the art this signal is utilized in an electronic circuit to control the amount of power supplied to the motor 64 to keep the angular velocity of the capstan 66 constant. Capstan 66 drives the peripheral belt 28 which is preferably endless and jointless and formed of a high tensile strength relatively inelastic polymer material such as H-film, a polyimide, or polyethylene terephthalate. Preferably, as shown in FIG. 4, the belt is of a little less width than the width of the magnetic tape 42. The belt 28 engages the tape packs 20, 22 as shown and is separated from the magnetic tape 42 as it leaves the tape packs. It is guided by belt guides or idlers 30, 32 and 34 which preferably incorporate ball bearings producing minimum friction and having virtually no end play. As shown in FIG. 4, the surfaces of the tape guides 30, 32 and 34 are slightly convexly curved so that the peripheral belt 28 is self-centering thereon.

Figure 3:
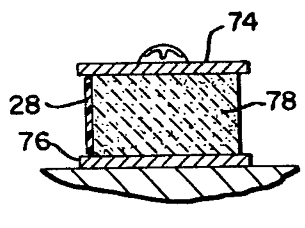
FIG. 3 is a fragmentary cross-sectional view taken along the line 3—3 of FIG. 1.

The peripheral belt 28 engages a friction brake shoe 40 best seen in FIG. 3 comprising a pair of metallic plates 74 and 76 and a solid graphite block 78. Plates 74 and 76 serve as vertical guides for the belt 28 which frictionally engages the solid graphite block 78.

Figure 5:
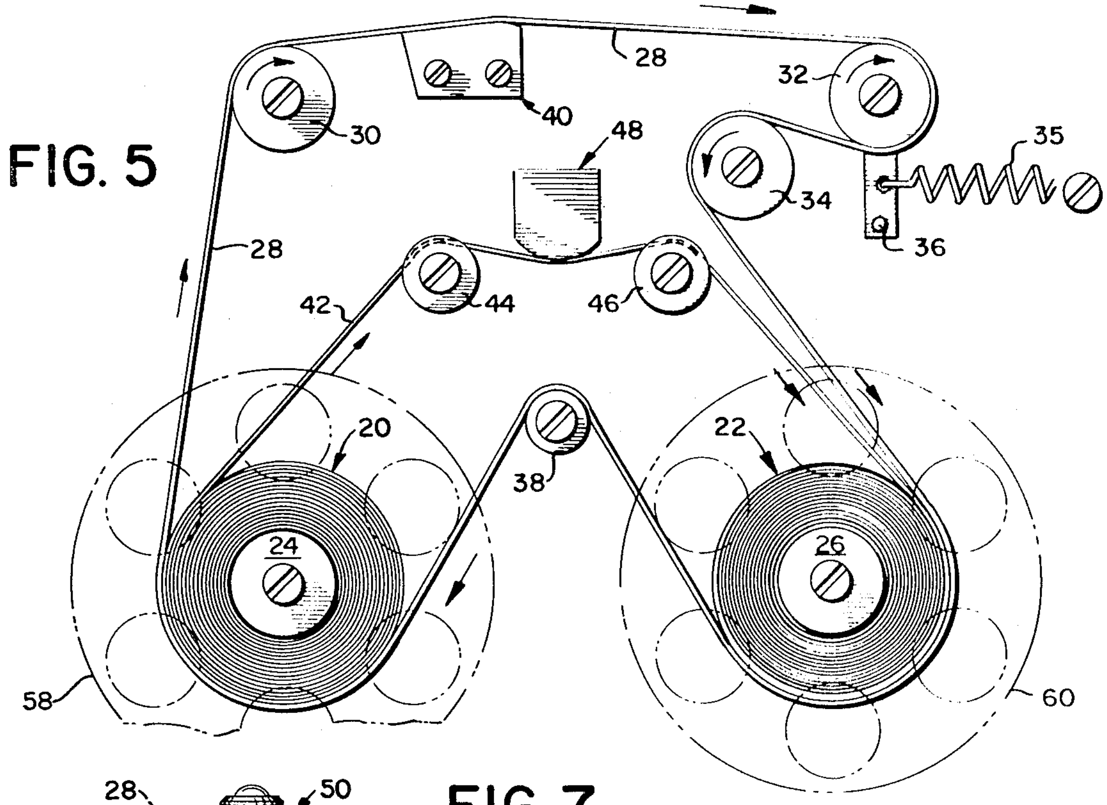
FIG. 5 is a schematic diagram of the tape transport of FIG. 1.

Referring to FIG. 5, the portion of the belt 28 between the brake 40 and the capstan 38 on the right will be stretched and the portion between the capstan 38 and the brake 40 and the left will be relatively contracted when the capstan is driving the belt 28 in the direction shown by the arrows. The stretched portion of the belt 28 in contact with tape pack 22 will therefore have a slightly greater peripheral speed than the portion of the belt 28 in contact with the tape pack 20. The resulting overdrive of the tape pack 22 will put a tension in tape 42 as it is driven from tape pack 20 to tape pack 22.

The magnetic tape 42 passes over a pair of conventional nonrotatable tape guides 44 and 46 mounted to a head assembly plate 80 (FIG. 1). Also mounted to head assembly plate 80 is a magnetic head 82 and a magnetic shield 84. Head assembly plate 80 is mounted to transport plate 62 by means of bolts 86 and 88. Head to tape contact is maintained solely by the tension in the tape 42 and the geometry of the head 82 and the guides 44 and 46. Thus the head and guides may be prealigned on the head plate 82 and the head plate affixed to the transport plate 62. If the head and guides become misaligned or the head inoperative they may be removed by removing plate 80 and replacing them with another prealigned unit. An electrical connector 90 is provided for disconnecting and reconnecting head 82.

The tape transport is provided with a beginning of tape and end of tape sensor 92 best seen in FIG. 4 which includes a light source (not shown) and a pair of phototransistors 94 and 96 for sensing windows formed in the magnetic tape 42 by removing the oxide layer thereof at the top edge of the tape adjacent to one end of the tape and at the bottom edge adjacent the other end of the tape. Activation of both phototransistors 94 and 96 simultaneously indicates that no tape is present at sensor 92.

As previously explained, the tape 42 is preferably wrapped about but not attached in any way to the hubs 24 and 26 to which are affixed conventional, compatible reel flanges 68 and 60. These are mounted by means of single screws 98 and 100 to ball bearing reel-mounting assemblies 102 and 104 mounted in transport plate 62. Thus the tape packs 20 and 22 may be conveniently removed by removing the belt 28 and the screws 98 and 100.

Constant tension is maintained in the belt 28 by spring biasing tension idler roller 32 mounted on a tension arm 106 which is rotatable about a pivot 108. An offset counterweight 110 is provided for statically balancing the tension arm assembly. The entire assembly is mounted to tension an arm assembly plate 112 which is affixed to transport plate 62 by means of screws 114 and 116. Tension is provided by a tightly wound spiral spring 118 (FIG. 2), the tension of which may be adjusted by turning screw 120.

A radiofrequency interference filter 122 and a time totalizing meter 124 connected in the motor circuit may be mounted on transport plate 62. All electrical and electronic connections are made through a single connector 126 so that the unit may be hermetically sealed in a nitrogen atmosphere, as in conventional, with the connector 126 providing all the connections thereto. The entire sealed unit may be plugged in or removed from its associated electronics in the aircraft and another unit substituted, as required.

Figure 6:
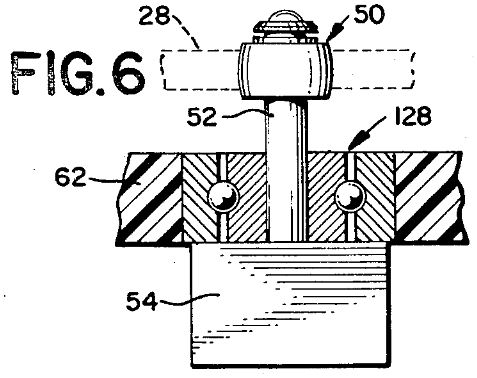
FIG. 6 is a fragmentary front view partially in cross section of an alternative embodiment of the invention; and, FIG. 7 is an enlarged fragmentary view of a portion of the tape transport of FIG. 1.

Now referring to FIG. 6, although the above construction provides an aircraft recorder having an extremely long effective lifetime, increased lifetime may be provided by reducing wear on the peripheral drive belt 28. This may be accomplished by substituting for the frictional brake 40 in contact with the belt 28, a rotating guide 50 mounted on a shaft 52 within a bearing schematically shown at 128 in the transport plate 62. Shaft 52 then drives an energy-dissipating element, such as a mechanical, viscous, magnetic or eddy current brake, or an electrical generator having its output coil shorted.

Figure 7:
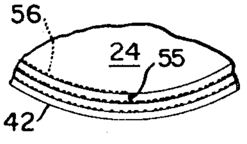

An important feature of the invention is the fact that the magnetic recording tape 42 is not affixed in any way to the hubs 24 and 26 or to the flanges 58 and 60. It is merely wrapped around the reels as shown in FIG. 7. Furthermore, the tape being lubricated has a graphite lubricant 56 on the backside thereof which lowers the friction between the inner layer of tape and the hub 24, and also between adjacent layers of tape. Thus, under conditions of stress induced by wide temperature variations, the tape 42 may rotate with respect to the hub 24 and with respect to itself greatly reducing the stress to which the inner layers of tape are subjected and preventing the catastrophic failures found in the prior art.

It should also be noted that the lubricated side of the tape is in contact with the nonrotating tape guides 44 and 46. The oxide-coated side of the tape only comes in contact with itself and the magnetic head 82 which is necessary for operation and with the peripheral drive belt which moves with substantially the same linear velocity when in contact with the magnetic tape 42. There is therefore an extremely small amount of wear in the tape when the transport is used.

There is thus provided a shop-repairable magnetic tape transport which may be sealed in an inert atmosphere and connected to an electronic unit by a single connector. Factory aligned modular subassemblies permit maintenance by unskilled personnel. Tape packs may be conveniently replaced by the use of preloaded flanged reels compatible with reel-driven tape transports. The tape transport is very insensitive to vibration and shock and no vibration isolators are necessary when the transport is attached to an airframe.

A tape transport constructed in accordance with the above disclosure may be operated by a direct current motor at speeds of 10 and 20 inches per second. Up to 300 feet of ¼-inch instrumentation tape plus leaders may be provided on reels having a flanged diameter of 2.9 inches. Tape tension may be maintained below 4 ounces.

Since each tape reel is mounted to a small mechanical module which provides a precise ball bearing mounted shaft permitting reel rotation, substantially no drive or braking power is transmitted to the reels via the free-turning reel shafts. The only transport element which contacts the tape oxide surface outside the tape packs is the working gap surface of the head itself. The surface of the capstan may be specially coated to maximize the coefficient of friction at the belt capstan interface.

The system disclosed is completely bidirectional in that the direction of motion of the capstan may be reversed for recording in the opposite direction from that shown in FIG. 5.

The seamless peripheral drive belt 28 is preferably formed of a brand of H-film polyimine manufactured by the Dupont Company under the trademark Kapton. The Dupont brand of polyethylene terephthalate, Mylar, may also be used at lower temperatures. The magnetic tape 42 preferably employs a Mylar or Kapton base depending on temperature requirements. The belt 28 is preferably 1 mil thick.

The brake shoe block 78 is preferably formed of solid graphite such as is sold by U.S. Carbon under the name Graphitar.

Lubricated magnetic tapes which function well in the transports disclosed above include MT-22760 and No. 154 manufactured by Minnesota Mining and Manufacturing Corporation and others.

It will thus be seen that the objects set forth above, among those made apparent from the preceding description, are efficiently attained and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A tape transport comprising:

A. a recording tape spirally wound on a pair of freely rotatable tape packs with a portion of said tape passing between said packs;

B. an endless belt in contact with the outer layers of tape on said tape packs, a first portion of said belt being separated from the portion of said tape passing between said tape packs and said belt having an elasticity substantially equal to or less than polyimine or polyethylene terephthalate film 1 mil thick;

C. first means acting on and driving a second portion of said belt between said tape packs on the opposite side of said tape between said tape packs from said first portion of said belt; and, D. second means isolated from said first means and independently of said first means acting on a braking said first portion of said belt to provide a differential velocity to the portions of said belt in contact with said tape packs, wherein said recording tape packs are spirally wound on freely rotatable hubs and the ends thereof are not fastened to said hubs and are free to rotate with respect to said hubs.

2. A tape transport as defined in claim 1 wherein said recording tape is a magnetic tape having a magnetic-sensitive side and an insensitive side and wherein said tape is wound on said packs with the magnetic-sensitive side facing outward.

3. A tape transport as defined in claim 2 wherein said magnetic tape bears a lubricant on the magnetic-insensitive side thereof.

4. A tape transport as defined in Claim 1 and e. a pair of flanged tape reels supporting said tape packs.

5. A tape transport as defined in claim 4 wherein said tape bears a lubricant on one side thereof.

6. In a tape transport comprising:

A. a recording tape spirally wound on a pair of freely rotatable tape packs with a portion of said tape passing between said packs;

B. an endless belt in contact with the outer layers of tape on said tape packs, a first portion of said belt being separated from the portion of said tape passing between said tape packs;

C. first means acting on and driving a second portion of said belt between said tape packs on the opposite side of said tape between said tape packs from said first portion of said belt; and, D. second means acting on said first portion of said belt to provide a differential velocity to the portions of said belt in contact with said tape packs;

the improvement comprising:

E. said tape packs comprising freely rotatable hubs about which said tape is spirally wound, the ends of said tape being free to rotate with respect to said hubs.

7. A tape transport as defined in claim 6 wherein the sides of said tape have different coefficients of friction with respect to said hubs and said tape is wound with the side having the lowest coefficient friction with respect to said hubs against said hubs.

8. A tape transport as defined in claim 6 wherein the side of said tape facing said hubs is lubricated.

9. A tape transport as defined in claim 6 and

F. a pair of flanges affixed to each of said hubs to form flanged tape reels for supporting said tape packs.

10. A tape transport as defined in claim 9 wherein said tape is a magnetic tape bearing a lubricant on a magnetic-insensitive side thereof and wherein said tape is wound on said packs with the magnetic-insensitive side facing inward toward said hubs.

11. A tape transport as defined in claim 6 wherein said magnetic tape bears a lubricant on one side thereof.

* * * * *

151-016

UNITED STATES PATENT OFFICE

CERTIFICATE OF CORRECTION

Patent No. 3,620,473 Dated November 16, 1971

Inventor(s) Robert Stone

It is certified that error appears in the above-identified patent and that said Letters Patent are hereby corrected as shown below:

Column 3, Line 52, "pace" should be -- pack --

Column 4, Line 52, "and" second occurrence should be -- on --

Column 5, Line 26, "radiofrequency" should be two words

Column 5, Line 30, "in" second occurrence should be -- is --

Column 6, Line 58, "a" should be -- and --

Signed and sealed this 23rd day of May 1972.

(SEAL)
Attest:

EDWARD M.FLETCHER,JR.
Attesting Officer

ROBERT GOTTSCHALK
Commissioner of Patents